(12) United States Patent
Chen et al.

(10) Patent No.: US 7,802,025 B2
(45) Date of Patent: Sep. 21, 2010

(54) DMA ENGINE FOR REPEATING COMMUNICATION PATTERNS

(75) Inventors: Dong Chen, Croton on Hudson, NY (US); Alan G. Gara, Mount Kisco, NY (US); Mark E. Giampapa, Irvington, NY (US); Philip Heidelberger, Cortlandt Manor, NY (US); Burkhard Steinmacher-Burow, Esslingen (DE); Pavlos Vranas, Danville, CA (US)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 11/768,795

(22) Filed: Jun. 26, 2007

(65) Prior Publication Data

US 2009/0006296 A1 Jan. 1, 2009

(51) Int. Cl.
*G06F 13/28* (2006.01)

(52) U.S. Cl. .................... 710/22; 706/42; 709/212; 709/213

(58) Field of Classification Search .............. 710/14, 710/22; 706/402
See application file for complete search history.

(56) References Cited

U.S. PATENT DOCUMENTS

| | | | |
|---|---|---|---|
| 4,777,595 A | 10/1988 | Strecker et al. |
| 5,063,562 A | 11/1991 | Barzilai et al. |
| 5,142,422 A | 8/1992 | Zook et al. |
| 5,349,587 A | 9/1994 | Nadeau-Dostie et al. |
| 5,353,412 A | 10/1994 | Douglas et al. |
| 5,452,432 A | 9/1995 | Macachor |
| 5,524,220 A | 6/1996 | Verma et al. |
| 5,634,007 A | 5/1997 | Calta et al. |
| 5,659,710 A | 8/1997 | Sherman et al. |
| 5,708,779 A | 1/1998 | Graziano et al. |
| 5,761,464 A | 6/1998 | Hopkins |
| 5,796,735 A | 8/1998 | Miller et al. |
| 5,809,278 A | 9/1998 | Watanabe et al. |
| 5,825,748 A | 10/1998 | Barleu et al. |

(Continued)

OTHER PUBLICATIONS

Definition of "mechanism", Oxford English Dictionary, http://dictionary.oed.com/cgi/entry/00304337? query_type=word &queryword=mechanism&first=1&max_to_show=10 &sort_type=alpha&result_place=2&search_id=y2atElGc-11603 &hilite+00304337.

(Continued)

*Primary Examiner*—Henry W. H. Tsai
*Assistant Examiner*—Ellas Mamo
(74) *Attorney, Agent, or Firm*—Scully, Scott, Murphy & Presser, P.C.; Daniel P. Morris, Esq.

(57) ABSTRACT

A parallel computer system is constructed as a network of interconnected compute nodes to operate a global message-passing application for performing communications across the network. Each of the compute nodes includes one or more individual processors with memories which run local instances of the global message-passing application operating at each compute node to carry out local processing operations independent of processing operations carried out at other compute nodes. Each compute node also includes a DMA engine constructed to interact with the application via Injection FIFO Metadata describing multiple Injection FIFOs where each Injection FIFO may containing an arbitrary number of message descriptors in order to process messages with a fixed processing overhead irrespective of the number of message descriptors included in the Injection FIFO.

18 Claims, 4 Drawing Sheets

U.S. PATENT DOCUMENTS

| | | | |
|---|---|---|---|
| 5,890,211 | A | 3/1999 | Sokolov et al. |
| 5,917,828 | A | 6/1999 | Thompson |
| 6,023,732 | A * | 2/2000 | Moh et al. ............... 709/232 |
| 6,061,511 | A | 5/2000 | Marantz et al. |
| 6,072,781 | A | 6/2000 | Feeney et al. |
| 6,122,715 | A | 9/2000 | Palanca et al. |
| 6,185,214 | B1 | 2/2001 | Schwartz et al. |
| 6,219,300 | B1 | 4/2001 | Tamaki |
| 6,263,397 | B1 | 7/2001 | Wu et al. |
| 6,295,571 | B1 | 9/2001 | Scardamalia et al. |
| 6,311,249 | B1 | 10/2001 | Min et al. |
| 6,324,495 | B1 | 11/2001 | Steinman |
| 6,356,106 | B1 | 3/2002 | Greeff et al. |
| 6,366,984 | B1 | 4/2002 | Carmean et al. |
| 6,442,162 | B1 | 8/2002 | O'Neill et al. |
| 6,466,227 | B1 | 10/2002 | Pfister et al. |
| 6,564,331 | B1 | 5/2003 | Joshi |
| 6,594,234 | B1 | 7/2003 | Chard et al. |
| 6,598,123 | B1 | 7/2003 | Anderson et al. |
| 6,601,144 | B1 | 7/2003 | Arimilli et al. |
| 6,631,447 | B1 | 10/2003 | Morioka et al. |
| 6,647,428 | B1 | 11/2003 | Bannai et al. |
| 6,662,305 | B1 | 12/2003 | Salmon et al. |
| 6,735,174 | B1 | 5/2004 | Hefty et al. |
| 6,775,693 | B1 | 8/2004 | Adams |
| 6,799,232 | B1 | 9/2004 | Wang |
| 6,880,028 | B2 | 4/2005 | Kurth |
| 6,889,266 | B1 * | 5/2005 | Stadler ....................... 710/22 |
| 6,894,978 | B1 | 5/2005 | Hashimoto |
| 6,954,887 | B2 | 10/2005 | Wang et al. |
| 6,986,026 | B2 | 1/2006 | Roth et al. |
| 7,007,123 | B2 | 2/2006 | Golla et al. |
| 7,058,826 | B2 | 6/2006 | Fung |
| 7,065,594 | B2 | 6/2006 | Ripy et al. |
| 7,143,219 | B1 | 11/2006 | Chaudhari et al. |
| 7,191,373 | B2 | 3/2007 | Wang et al. |
| 7,239,565 | B2 | 7/2007 | Liu |
| 7,280,477 | B2 | 10/2007 | Jeffries et al. |
| 7,298,746 | B1 | 11/2007 | De La Iglesia et al. |
| 7,363,629 | B2 | 4/2008 | Springer, et al. |
| 7,373,420 | B1 | 5/2008 | Lyon |
| 7,401,245 | B2 | 7/2008 | Fischer et al. |
| 7,454,640 | B1 | 11/2008 | Wong |
| 7,454,641 | B2 | 11/2008 | Connor et al. |
| 7,461,236 | B1 | 12/2008 | Wentzlaff |
| 7,463,529 | B2 | 12/2008 | Matsubara |
| 7,539,845 | B1 | 5/2009 | Wentzlaff et al. |
| 7,613,971 | B2 | 11/2009 | Asaka |
| 7,620,791 | B1 | 11/2009 | Wentzlaff et al. |
| 7,698,581 | B2 | 4/2010 | Oh |
| 2001/0055323 | A1 | 12/2001 | Rowett et al. |
| 2002/0078420 | A1 | 6/2002 | Roth et al. |
| 2002/0087801 | A1 | 7/2002 | Bogin et al. |
| 2002/0100020 | A1 | 7/2002 | Hunter et al. |
| 2002/0129086 | A1 | 9/2002 | Garcia-Luna-Aceves et al. |
| 2002/0138801 | A1 | 9/2002 | Wang et al. |
| 2002/0156979 | A1 | 10/2002 | Rodriguez |
| 2002/0184159 | A1 | 12/2002 | Tadayon et al. |
| 2003/0007457 | A1 | 1/2003 | Farrell et al. |
| 2003/0028749 | A1 | 2/2003 | Ishikawa et al. |
| 2003/0050714 | A1 | 3/2003 | Tymchenko |
| 2003/0050954 | A1 | 3/2003 | Tayyar et al. |
| 2003/0074616 | A1 | 4/2003 | Dorsey |
| 2003/0105799 | A1 | 6/2003 | Khan et al. |
| 2003/0163649 | A1 | 8/2003 | Kapur et al. |
| 2003/0177335 | A1 | 9/2003 | Luick |
| 2003/0188053 | A1 | 10/2003 | Tsai |
| 2003/0235202 | A1 | 12/2003 | Van Der Zee et al. |
| 2004/0003184 | A1 | 1/2004 | Safranek et al. |
| 2004/0019730 | A1 | 1/2004 | Walker et al. |
| 2004/0024925 | A1 | 2/2004 | Cypher et al. |
| 2004/0073780 | A1 | 4/2004 | Roth et al. |
| 2004/0103218 | A1 | 5/2004 | Blumrich et al. |
| 2004/0210694 | A1 | 10/2004 | Shenderovich |
| 2004/0243739 | A1 | 12/2004 | Spencer |
| 2005/0007986 | A1 | 1/2005 | Malladi et al. |
| 2005/0053057 | A1 | 3/2005 | Deneroff et al. |
| 2005/0076163 | A1 | 4/2005 | Malalur |
| 2005/0160238 | A1 | 7/2005 | Steely et al. |
| 2005/0216613 | A1 | 9/2005 | Ganapathy et al. |
| 2005/0251613 | A1 | 11/2005 | Kissell |
| 2005/0270886 | A1 | 12/2005 | Takashima |
| 2005/0273564 | A1 | 12/2005 | Lakshmanamurthy et al. |
| 2006/0050737 | A1 | 3/2006 | Hsu |
| 2006/0080513 | A1 | 4/2006 | Beukema et al. |
| 2006/0206635 | A1 | 9/2006 | Alexander et al. |
| 2006/0248367 | A1 | 11/2006 | Fischer et al. |
| 2007/0055832 | A1 | 3/2007 | Beat |
| 2007/0133536 | A1 | 6/2007 | Kim et al. |
| 2007/0168803 | A1 | 7/2007 | Wang et al. |
| 2007/0174529 | A1 | 7/2007 | Rodriguez et al. |
| 2007/0195774 | A1 | 8/2007 | Sherman et al. |
| 2008/0147987 | A1 | 6/2008 | Cantin et al. |

OTHER PUBLICATIONS

Almasi, et al., "MPI on BlueGene/L: Designing an Efficient General Purpose Messaging Solution for a Large Cellular System," IBM Research Report RC22851 (W037-150) Jul. 22, 2003.

Almasi, et al.,"Optimization of MPI Collective Communication on BlueGene/L Systems," ICS'05, Jun. 20-22, 2005, Boston, MA.

Gara, et al., "Overview of the Blue Gene/L system architecture," IBM J. Res. & Dev., vol. 49, No. 2/3, Mar./May 2005, pp. 195-212.

Huang, et al., "Performance Evaluation of Adaptive MPI," PPoPP'06, Mar. 29-31, 2006, New York, New York.

MPI (Message Passing Interface) standards documents, errata, and archives http://www.mpi-forum.org visited Jun. 16, 2007 (Sections 4.2, 4.4 and 10.4).

David Chaiken, Craig Fields, Kiyoshi Kurihara, Anant Agarwal, Directory-Based Cache Coherence in Large-Scale Multiprocessors, Computer, v.23 n.6, p. 49-58, Jun. 1990.

Michel, Dubois, Christoph Scheurich, Faye A. Briggs, Synchronization, Coherence, and Event Ordering in Multiprocessors, Computer, v.21 n.2, p. 9-21, Feb. 1988.

Giampapa, et al., "Blue Gene/L advanced diagnostics environment," IBM J. Res. & Dev., vol. 49, No. 2/3, Mar./May 2005, pp. 319-331.

IBM Journal of Research and Development, Special Double Issue on Blue Gene, vol. 49, Nos. 2/3, Mar./May 2005 ("Preface").

IBM Journal of Research and Development, Special Double Issue on Blue Gene, vol. 49, Nos. 2/3, Mar./May 2005 ("Intro").

"Intel 870: A Building Block For Cost-Effective, Scalable Servers", Faye Briggs, Michel et al., pp. 36-47, Mar.-Apr. 2002.

Pande, et al. Performance Evaluation and Design Trade-Offs for Network-On-Chip Interconnect Architectures, 2005, IEEE, pp. 1025-1040.

\* cited by examiner

PRIOR ART

Injection FIFO Metadata 310

| |
|---|
| start address (RW) 311 |
| end address (RW) 312 |
| producer address (RW) 313 |
| consumer address (RW) 314 |
| is_empty bit (R) 315 |
| is_full bit (R) 316 |
| was_threshold_crossed bit (R) 317 |
| clear_threshold_crossed bit (W) 318 |
| is_active bit (R) 319 |
| activate bit (W) 320 |
| deactivate bit (W) 321 |
| enable bit (SRW) 322 |
| priority bit (SRW) 323 |
| threshold value (SRW) 324 |
| service_quantum value (SRW) 325 |
| network_resources bitmask (SRW) 326 |
| threshold_interrupt bit (SRW) 327 |

DMA ENGINE FOR REPEATING COMMUNICATION PATTERNS

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract. No. B554331 awarded by the Department of Energy.

CROSS-REFERENCE TO RELATED APPLICATIONS

The present invention is related to the following commonly-owned, co-pending United States Patent Applications filed on even date herewith, the entire contents and disclosure of each of which is expressly incorporated by reference herein as if fully set forth herein. U.S. patent application Ser. No. 11/768,777, for "A SHARED PERFORMANCE MONITOR IN A MULTIPROCESSOR SYSTEM"; U.S. patent application Ser. No. 11/768,645, for "OPTIMIZED COLLECTIVES USING A DMA ON A PARALLEL COMPUTER"; U.S. patent application Ser. No. 11/768,781, for "DMA SHARED BYTE COUNTERS IN A PARALLEL COMPUTER"; U.S. patent application Ser. No. 11/768,784, for "MULTIPLE NODE REMOTE MESSAGING"; U.S. patent application Ser. No. 11/768,697, for "A METHOD AND APPARATUS OF PREFETCHING STREAMS OF VARYING PREFETCH DEPTH"; U.S. patent application Ser. No. 11/768,532, for "PROGRAMMABLE PARTITIONING FOR HIGH-PERFORMANCE COHERENCE DOMAINS IN A MULTIPROCESSOR SYSTEM"; U.S. patent application Ser. No. 11/768,857, for "METHOD AND APPARATUS FOR SINGLE-STEPPING COHERENCE EVENTS IN A MULTIPROCESSOR SYSTEM UNDER SOFTWARE CONTROL"; U.S. patent application Ser. No. 11/768,547, for "INSERTION OF COHERENCE REQUESTS FOR DEBUGGING A MULTIPROCESSOR"; U.S. patent application Ser. No. 11/768,791, for "METHOD AND APPARATUS TO DEBUG AN INTEGRATED CIRCUIT CHIP VIA SYNCHRONOUS CLOCK STOP AND SCAN"; U.S. patent application Ser. No. 11/768,799, for "METHOD AND APPARATUS FOR GRANTING PROCESSORS ACCESS TO A RESOURCE"; U.S. patent application Ser. No. 11/768,800, for "METHOD AND APPARATUS FOR EFFICIENTLY TRACKING QUEUE ENTRIES RELATIVE TO A TIMESTAMP"; U.S. patent application Ser. No. 11/768,572, for "BAD DATA PACKET CAPTURE DEVICE"; U.S. patent application Ser. No. 11/768,593, for "EXTENDED WRITE COMBINING USING A WRITE CONTINUATION HINT FLAG"; U.S. patent application Ser. No. 11/768,805, for "A system and method for PROGRAMMABLE BANK SELECTION FOR BANKED MEMORY SUBSYSTEMS"; U.S. patent application Ser. No. 11/768,905, for "AN ULTRASCALABLE PETAFLOP PARALLEL SUPERCOMPUTER"; U.S. patent application Ser. No. 11/768,810, for "DATA EYE MONITOR METHOD AND APPARATUS"; U.S. patent application Ser. No. 11/768,812, for "A CONFIGURABLE MEMORY SYSTEM AND METHOD FOR PROVIDING ATOMIC COUNTING OPERATIONS IN A MEMORY DEVICE"; U.S. patent application Ser. No. 11/768,559, for "ERROR CORRECTING CODE WITH CHIP KILL CAPABILITY AND POWER SAVING ENHANCEMENT"; U.S. patent application Ser. No. 11/768,552, for "STATIC POWER REDUCTION FOR MIDPOINT-TERMINATED BUSSES"; U.S. patent application Ser. 11/768,527, for "COMBINED GROUP ECC PROTECTION AND SUBGROUP PARITY PROTECTION"; U.S. patent application Ser. No. 11/768,669, for "A MECHANISM TO SUPPORT GENERIC COLLECTIVE COMMUNICATION ACROSS A VARIETY OF PROGRAMMING MODELS"; U.S. patent application Ser. No. 11/768,813, for "MESSAGE PASSING WITH A LIMITED NUMBER OF DMA BYTE COUNTERS"; U.S. patent application Ser. No. 11/768,619, for "ASYNCRONOUS BROADCAST FOR ORDERED DELIVERY BETWEEN COMPUTE NODES IN A PARALLEL COMPUTING SYSTEM WHERE PACKET HEADER SPACE IS LIMITED"; U.S. patent application Ser. No. 11/768,682, for "HARDWARE PACKET PACING USING A DMA IN A PARALLEL COMPUTER"; and U.S. patent application Ser. No. 11/768,752, for "POWER THROTTLING OF COLLECTIONS OF COMPUTING ELEMENTS".

BACKGROUND OF THE INVENTION

This invention relates to the field of message-passing in a distributed-memory parallel computer network for large data processing applications such as for computation in the field of life sciences, and more particularly relates to a DMA engine constructed for handling repeating communication patterns within individual compute nodes comprising a parallel computer system comprising a plurality of interconnected compute nodes.

A message-passing data network serves to pass messages between compute nodes comprising distributed-memory parallel computer system, e.g., BlueGene/P ultrascalable Petaflop Parallel Supercomputer, by IBM Corporation. Each compute node comprising such a network or system includes one or more computer processors that run local instances of applications operating globally on local memory at the compute node, and performs local operations independent of the other compute nodes. Compute nodes can act in concert by passing messages between each other over the distributed-memory parallel computer system. The local instances of the applications also use other local devices, such as a DMA network interface, which is described in detail below. The global application operates across the multiple compute nodes comprising the parallel computer system to coordinate global actions and operations across the nodes, including passing messages therebetween.

The hardware comprising each compute node within the parallel computer system includes a DMA network interface. During normal parallel computer system operation, the local instances of the global application running on a local compute node may send a message to another compute node by first injecting the message into its DMA network interface. The DMA network interface forwards the message onto the network, which passes the message to the DMA network interface on the receiving compute node. The message is received by the local instance of the software program application at same receiving compute node.

Various network interfaces, as distinguished from DMA network interfaces, are known that accept a description, or message descriptor of each message to be exchanged or passed within a parallel computer system. Such known compute node network interfaces are described in: Welsh, et al., "Incorporating Memory Management into User-Level Network Interfaces", TR97-1620, Dept. Computer Science, Cornell Univ., Ithaka, N.Y., 1997 ("the Welsh reference"); Pratt, et al., Arsenic: A user-accessible gigabit ethernet interface; *Proceedings of the Twentieth Annual Joint Conference of the*

IEEE Computer and Communications Societies (INFOCOM-01), pages 67-76, April 2001 ("the Pratt reference"); and U.S. Pat. No. 5,751,951 to Osborne, et al., issued May 12, 1998 and entitled: Network Interface ("the '951 patent").

Figure 2:
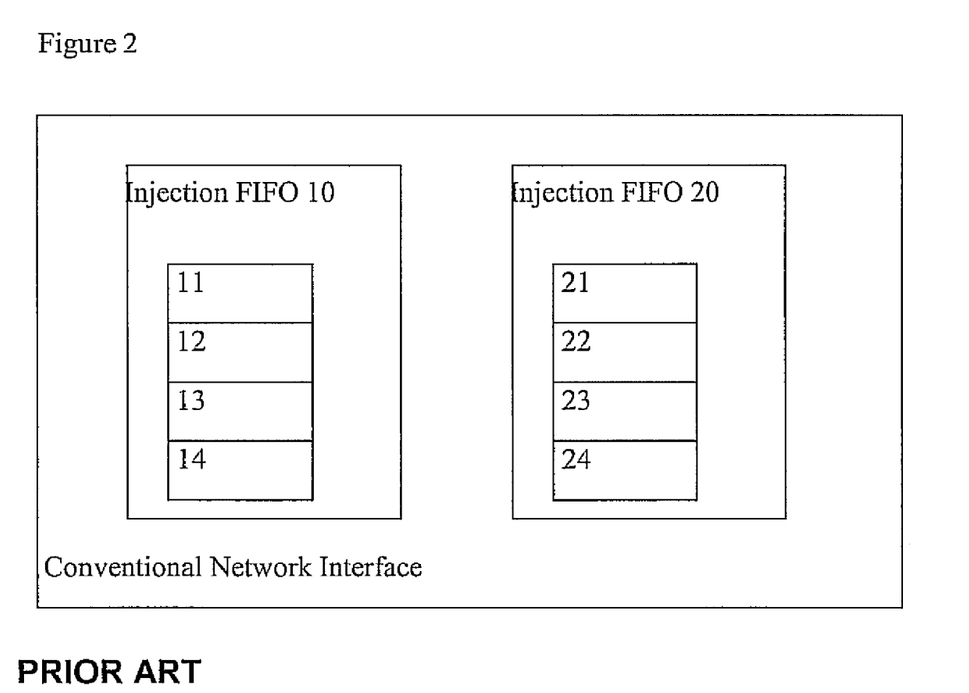
FIG. 2 is a schematic diagram illustrating a conventional network interface for exposing one or more Injection FIFOs to an application running on a conventional parallel computer system.

FIG. 2 herein is a schematic diagram depicting a conventional network interface that includes two (or more) Injection FIFOs (10, 20) that are controlled by a message-passing application running on a conventional parallel computer system (not shown). Each Injection FIFO is arranged to provide storage for one or more message descriptors that are injected into the conventional interface from a compute node. Injection FIFOs 10 provide storage for 4 message descriptors: 11, 12, 13, 14; and Injection FIFOs 20 provide storage for 4 message descriptors: 21, 22, 23, 24.

The message descriptors for the message passing are typically maintained in a fixed predetermined area, which may be in application memory. Each message descriptor typically includes a pointer to the local application data to be sent, the length of the data to be sent and a description of the remote compute node and associated remote memory locations slated to receive the data at the remote compute node. Given a message descriptor, the conventional network interface at the sending compute node sends the corresponding message.

The conventional arts including the above-cited prior art references are constructed to operate by handling, and handing off into one of perhaps several Injection FIFO each individual message descriptor individually, or as separate operations. The number of Injection FIFOs and their properties are fixed in prior art. In such known conventional network interfaces, the Injection FIFOs are known to comprise some part of the conventional network interface. Thus, a local instance of the global application sending the data must first individually insert each message descriptor into an Injection FIFO at its conventional network interface. The efforts required by the sending node using the local instance of the application to carry such known messaging and protocol is proportional to the number of messages to be exchanged. Accordingly, both the global application and the performance of the local instances of the application running at a compute node decreases with the number of messages to be sent/received.

This invention, broadly, concerns the use and re-use of multiple message descriptors. A message descriptor describes a message to a single node. Whether an individual message descriptor is simple or sophisticated is not of concern here. For example, the Welsch reference provides for message-passing operation that utilizes complex message descriptors using a technique defined as static chaining, which includes the combining of linked list representations of multiple frames of data for the same connection (compute node) by the host before the host queues the chain in the transmit input queue. The Welsch reference articulates that benefit of such a technique includes that only one frame descriptor of the chain, or linked list representations is required to describe multiple frames for the same connection (compute node). Such a chain or frame descriptor in the Welsch reference corresponds to a single message descriptor.

As described above, the conventional arts including the above-cited prior art references are constructed to operate by handling, and handing off each individual message descriptor individually, or as separate operations. The prior art techniques may be extended to better serve an iterative application, which repeatedly performs a computation phase followed by a communication phase. Such iterations may comprise a part of many global applications for simulating a physical system, a financial system or other complex systems, where the communication pattern is the same and only the application data transferred differs between iterations. The same message descriptors are used in the known prior art applications to communicate the changing application data. That is, the same message descriptors in the Injection FIFO are created in the first iteration, and re-used for subsequent iterations.

In the prior art, re-using the message descriptors requires a local processor core to copy each message descriptor into the local (conventional) network interface. In other words, the prior art requires a processor core to copy the contents of the message buffer into the local (conventional) network interface. In this invention, the global message-passing application initiates the entire communication phase by providing the conventional network interface with a brief description of the Injection FIFO. This invention thus frees the processor core from copying each message descriptor into the local (conventional) network interface. The processor core thus is made available for other work for the application.

MPI is the industry-standard message-passing interface, and used in parallel computer systems. An MPI program consists of autonomous processes, executing their own code, which need not be identical. Typically, each process or application communicates via calls to MPI communication primitives, where each process executes in its own and shared memory. Such message passing allows the local processors comprising the compute node, and applications running thereon (a thread or instance of the global application or process) to cooperate with each other. Generally speaking, an MPI is an interface designed to allow a user to code data such that the local processors at the compute nodes comprising the network are able to send and receive data and information to coordinate the disposition of the global application or process. MPI is available on a wide variety of platforms ranging from massively parallel systems (IBM, Cray, Intel Paragon, etc.) to networks of workstations.

The use of Direct Memory Address (DMA) technology provides for reducing CPU (processor) workload in the management of memory operations required for messaging in any computer system, and are particularly relied on in large parallel computer systems. DMA, or DMA engines, work in conjunction with the local application or thread implementing the MPI application, for example, within a conventional network interface such as that of prior art FIG. 2. Workload that would normally have to be processed by a CPU at a compute node is instead handled by the DMA engine. The use of DMA technology in large parallel computer systems is limited somewhat by such system's inherent the need for tight hardware control and coordination of memory and message-passing operations. That is, required tight coupling between memory operations and CPU operations poses some challenges, including the need for a sending side compute node (a source compute node originating a message to be passed to another or multiple other compute nodes) to have awareness of the receiver node's remote address spaces, multiple protection domains, locked down memory requirements (also called pinning), notification, striping, recovery models, etc.

In parallel computer, such as IBM, Inc.'s BlueGene/P, a "Rendezvous" protocol is often used to send long messages between compute nodes. Following the Rendezvous protocol, a source compute node (a thread or instance of the global application running on the sending side) sends a long message by first passing a request to send (RTS) packet to the target compute node. The RTS contains information or data identifying the source compute node and the message being sent, e.g., number of total bytes. The target compute node replies to the RTS by generating and sending a "CTS (clear to send)" packet, assuming the target compute node is able to receive. The CTS includes information or data describing the target compute node (destination side) in order to receive the entire message. Finally, the source compute node sends self-describing "data" packets to the Target node, which can arrive in any order. The packet transfer continues until the entire message has been sent. RTS packet transfers, or message transfers following the Rendezvous protocol, are ordered with respect to the transfer of other messages out of a compute node, or into a compute node, e.g., with respect to other rendezvous or eager messages.

What would be desirable in the field of parallel computer systems and their design, and in particular in parallel computer systems including network interfaces or DMA engines constructed to perform remote message passing efficiently for repeated communication patterns in an application. For such a repeated communication pattern, the desired amount of effort or overhead required by an application running on a compute node to carry out the messaging is fixed, regardless of the number of messages in order to contain the effort and attention required by the local compute node in handling the messaging via the Injection FIFOs to maintain local performance without degradation even as the number of messages increases.

SUMMARY OF THE INVENTION

The present invention overcomes the described shortcomings of conventional network interfaces and/or DMA engines comprising compute nodes in known parallel computer system comprising said compute nodes, and their related methods of message passing operation.

The present invention provides a unique solution to the known limitations in message passing within parallel computer systems by providing a DMA engine at the compute nodes comprising the parallel computer system with Injection FIFO Metadata describing multiple Injection FIFOs where each Injection FIFO may contain an arbitrary number of messages. The novel DMA engine, novel parallel computer system comprising the DMA engine, and method for message passing in a parallel computer system that utilizes such novel DMA engine fixes the amount of effort required by an application running on a compute node to carry out messaging, regardless of the number of messages. By containing the effort and attention required by the local instances of the global application in handling the messaging via the Injection FIFOs, overall system and local performance is not degraded by an increasing number of messages.

For example, a local instance of a global application running at a compute node may implement a computation phase followed by a communication phase. The novel DMA engine, and its operation, at the end of the computation phase, provides for the application to initiate the entire communication phase by merely providing a description of the Injection FIFO to the DMA engine. The message descriptors in the Injection FIFO are created in the computation phase. Hence, handing-off an entire Injection FIFO is faster than initiating the communication phase by handing off each individual message descriptor in the FIFO, as is the case in the prior art message-passing practices.

The present invention provides the Injection FIFO to the DMA engine using Injection FIFO Metadata, which Injection FIFO Metadata is part of the DMA engine. For that matter, the novel DMA engine provides Injection FIFO Metadata for multiple Injection FIFOs. The Injection FIFO Metadata provides for fine-grain control over the Injection FIFO. For example, and assuming that the Injection FIFO comprises a circular buffer, all message descriptors are identified and exchanged by use of a producer (or source) pointer and a consumer (or target) pointer. The DMA engine moves the consumer pointer as it sends the messages. After the DMA engine sends all the messages, the producer and consumer pointers are equal. If the application wishes to send the same communication pattern, the invention provides that the application running on the parallel computer system need only set the consumer pointer to its original value. Consequently, the other elements of the Injection FIFO remain unchanged, and need not be re-written by the application. Thus, such a repeating communication pattern is efficiently served.

The invention is useful in other message communication scenarios for parallel computer systems. For example, where an application has many repeating communication patterns, the novel message-passing that utilizes the novel DMA engine improves message-passing operation where there are more communication patterns than Injection FIFO Metadata (provided by the DMA engine), and where the message descriptors for a particular communication pattern are stored in a circular buffer. In order to start a communication pattern, the local instance of the application merely writes a few words describing the circular buffer into the Injection FIFO Metadata of the DMA engine. Such effort is small, and is independent of the number of messages in the communication pattern.

In one embodiment, the invention comprises a parallel computer system is constructed as a network of interconnected compute nodes to operate a global message-passing application for performing communications across the network. Each of the compute nodes includes one or more individual processors with memories which run local instances of the global message-passing application operating at each compute node to carry out local processing operations independent of processing operations carried out at other compute nodes. Each compute node also includes a DMA engine constructed to interact with the application via Injection FIFO Metadata describing multiple Injection FIFOs, where each Injection FIFO may contain an arbitrary number of message descriptors in order to process messages with a fixed processing overhead irrespective of the number of message descriptors included in the Injection FIFO.

In another embodiment, the invention comprises a method for passing messages within a parallel computer system comprising a network of interconnected compute nodes, wherein each of the compute nodes comprises one or more individual processors, memory and DMA engine. The method comprising steps including running a global message-passing application across the parallel computer system including running local instances at each compute node for passing messages into and out of the compute node by operation independent of other compute nodes, and to exchange messages with the compute nodes, in which each compute node also includes a DMA engine constructed to interact with the application via Injection FIFO Metadata describing multiple Injection FIFOs, where each Injection FIFO may contain an arbitrary number of message descriptors in order to process messages with a fixed processing overhead irrespective of the number of message descriptors included in the Injection FIFO.

BRIEF DESCRIPTION OF THE DRAWING FIGURES

The objects, features and advantages of the present invention will become apparent to one skilled in the art, in view of the following detailed description taken in combination with the attached drawings, in which.

DETAILED DESCRIPTION OF THE INVENTION

The DMA Engine For Repeating Communication Patterns, the distributed-memory parallel computer system including such novel DMA engine and novel method of message passing operation supported by the novel DMA engine is set forth and described herein for the purpose of conveying the broad inventive concepts. The drawings and descriptions provided are not meant to limit the scope and spirit of the invention in any way.

The present invention provides for remote message passing operation in a distributed memory parallel computer system such as IBM, Inc.'s ultrascalable petaflop parallel supercomputer, as described in commonly-owned, pending U.S. Pat. No. 7,761,687, filed concurrently herewith and entitled: ULTRASCALABLE PETAFLOP PARALLEL SUPERCOMPUTER, incorporated by reference herein. The novel ultrascalable petaflop parallel supercomputer may achieve 1 or multi petaflops, with up to 458,752 cores, or 114,688 nodes. The supercomputer is based upon System-On-a-Chip technology, where each processing node comprises a single Application Specific Integrated Circuit (ASIC).

The ASIC nodes are interconnected by multiple independent networks that optimally maximize packet communications throughput and minimize latency. The multiple networks may include three high-speed networks for parallel algorithm message passing including a Torus with direct memory access (DMA), collective network, and a Global Asynchronous network that provides global barrier and notification functions. These multiple independent networks may be collaboratively or independently utilized according to the needs or phases of an algorithm for optimizing algorithm-processing performance. The novel direct memory access (DMA) engine of this invention comprises such a DMA engine in the "Torus with DMA."

At least four modes of operation are supported by the novel parallel computer system with interconnected compute nodes: virtual mode, SMP 1-core mode, SMP 4-core mode and dual mode. In the virtual node mode, each of the processing cores will perform its own MPI (message passing interface) task independently. Each core uses a quarter of the memory (L3 and DRAM) of the compute node, while coherence among the four MPI within the node and across the nodes is maintained by MPI. In the SMP (Symmetric Multi Processor) 1-core mode, one core performs a single MPI task, using the entire memory capacity of the node. In the SMP 4-core mode, one MPI task with 4 threads is running, using the whole node memory capacity. In the fourth or dual mode, which is a hybrid case, two SMP MPI tasks are running, with each SMP task using 2 cores running a single thread each. Finally, the novel parallel computer system can also support modes such as a 1, 3 split, and 1, or 2 or 3 cores idling. Thus a node can trade off amount of memory versus parallelism, a feature unique to this supercomputer.

Because of the torus's DMA feature, internode communications can overlap with computations running concurrently on the compute nodes. Also, complex forms of messaging protocols, particularly arithmetic functions, which are commonly called "reduction functions", are required to be invoked on message data as it arrives. One compute node or processor core (of a plurality of compute node cores comprising a compute node) may be controlled to perform these functions without distracting computations on other core processors. Additionally, because of the computational power of the system I/O processor, the application running at a compute node is able to define arbitrarily complex reduction functions, supporting new algorithmic development that overlaps computational power with communication activities. For particular classes of parallel algorithms, or parts of parallel calculations, this architecture may apply the power of some or all cores to work in collaboration on communication activities.

The novel ultrascalable petaflop parallel supercomputer architecture allows the multiple networks to be utilized simultaneously, independently, or in collaboration. Because of the system-on-a-chip level integration, in collaboration with operating system software designed to take advantage of this architecture, alternating between such modes of operation can occur with minimal overheads. In cases where the computation is awaiting message arrival, this may happen automatically.

To connect compute nodes, multiple network paradigms are implemented for use individually or simultaneously by the compute nodes, and include three high-speed torus networks for parallel algorithm message passing. Additional networks are provided for external connectivity and are used for Input/Output, System Management and Configuration, and Debug and Monitoring services for the supercompute nodes. The high-speed networks preferably comprises an n-dimensional Torus, collective network, and Global Signal configurations. The use of each of these n-dimensional torus networks may switch back and forth based on algorithmic needs or phases of algorithms. For example, parts of calculations may be performed with the Torus, or part on the collective network that facilitates the development of new parallel algorithms that simultaneously employ multiple networks in novel ways.

Each compute node comprising the parallel computer system of the invention comprises a single ASIC, and a plurality of SDRAM-DDR2 memory chips. The compute nodes are interconnected through at least six (6) networks, the highest aggregate bandwidth of which is a nearest neighbor link that maps the compute nodes into a physical 3-dimensional torus. The interconnect structure comprises a torus with preferably no asymmetries as the compute nodes communicate with the same bandwidth and nearly the same latency to nodes that are physically close as to those which are physically located on neighboring racks. Such interconnect structure facilitates simpler programming models. The ASICs that power the nodes are based on system-on-a-chip (s-o-c) technology and incorporate all of the functionality needed by the system. The ASICs or compute nodes include 8 MB or more of extremely high bandwidth embedded DRAM. The compute nodes are physically small, allowing for a very high density of processing and optimizing cost/performance.

In a preferred embodiment, the system packaging of the parallel computer system comprises 512 processing nodes on a doubled-sided board or "midplane". Each processing or compute node contains 4 cores, or processor cores, for handling computation and message passing operations. In addition, associated with a prescribed plurality of processing nodes, is a dedicated compute node that comprises a quad-processor with external memory, for handling of I/O communications to and from the compute nodes. Each I/O node has an operating system (Linux based) that can handle basic tasks and all the functions' necessary for high performance real time code. For compiling, diagnostics, and analysis, a host machine running a global application is required. The I/O compute nodes contain a software layer above the layer on the compute nodes for handling host communications. The choice of host compute node depends on the class of applications, their bandwidth needs and performance requirements.

In preferred embodiments of the DMA engine, parallel computer system with DMA engine and novel message passing operation or method include that one or more DMA channels for data reception are supported to receive several intermixed packet streams by keeping track of number of received and outstanding packets belonging to a single message/packet stream. This is implemented using injection and reception byte counters in each DMA engine, which are set at the beginning of a reception of a packet stream at the remote compute node initiating the message passing operation. The reception or injection byte counters use a specified number of bytes, or specified number of packets that will be received. That is, at the reception of a packet, a channel field in the packet identifies the DMA engine and the corresponding DMA byte counter is updated. When the byte counter reaches 0, all packets/bytes have been received. The DMA engine then notifies the processor by raising the interrupt or uses some other means for processor notification (like polling).

Figure 1:
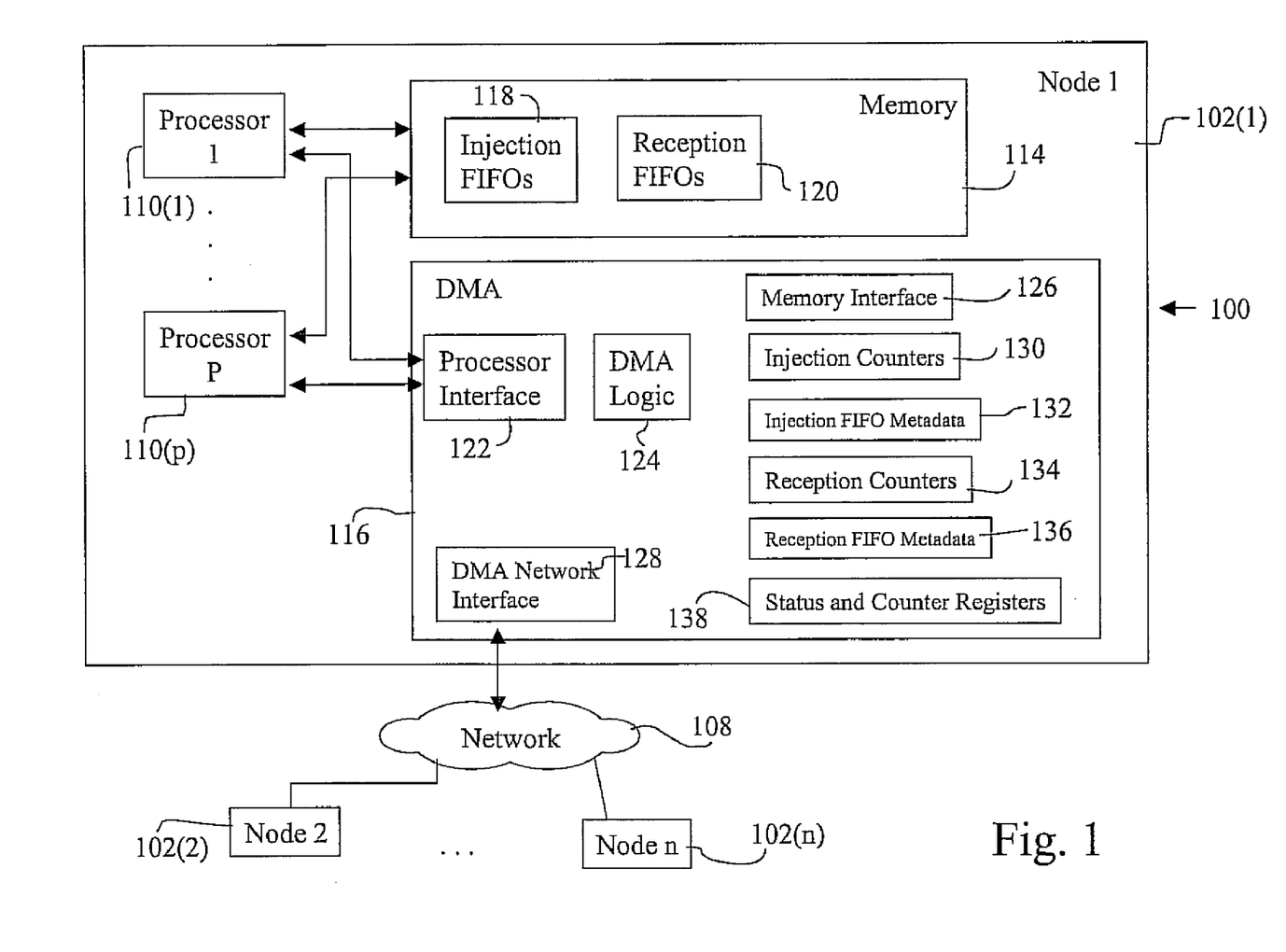
FIG. 1 is a schematic block diagram of a parallel computer system of the invention including a novel DMA engine for repeating communication patterns.

FIG. 1 herein is a schematic block diagram illustrating an ultrascalable petaflop parallel supercomputer ("parallel computer system 100") of the invention including the novel message passing using a limited number of DMA byte counters. Parallel computer system 100 comprises a plurality of individual compute nodes 102(1), 102(2) . . . 102(n), which as mentioned are constructed as single ASICs and interconnected across network 108. FIG. 1 highlights a preferred construction of one of the compute nodes, ASIC 102(1), constructed in accordance with the principles of the invention. Each of compute nodes (102(n)) is fabricated to integrate all the functions of a computer into a single compute ASIC to enable a dramatic reduction in node size and power consumption. In a supercomputer, or parallel computer system, the reduced node size and its lower power consumption provides for increased node density thereby decreasing the overall cost/performance for the parallel computer system (100).

In more detail, compute node or ASIC 102(1) may function as both a compute node and an I/O node in the parallel computer system (100). Compute node 102(1) comprises a plurality of processors or processor cores, 110(1), . . . 110(p), but preferably four (p=4). Each of the processor cores (110(p)) includes a "double" floating point unit, which unit that includes two coupled standard floating point units. This arrangement gives a peak performance of four floating point operations per processor core per clock cycle. Preferably, each processor or compute node core comprises a PowerPC450 embedded core available from IBM microelectronics. The skilled artisan should note that future versions of this core may be used as technology improves, without deviating from the scope and spirit of the invention. A description of the functionality of such a PowerPC450 core may be found at http://www.ibm.com/chips/power/powerpc/.

Besides the embedded processor cores 110(p), and floating point cores (not shown in FIG. 1), each node 102(1,2,n) of the parallel computer system 100 includes a DMA, or DMA engine 116 (DMA and DMA engine used interchangeably herein), and an embedded DRAM (memory 114). DRAM 114 includes Injection FIFOs 118 and reception FIFOs 120, and is controlled by an integrated external DDR2 memory controller (not shown in FIG. 1) and DMA engine (116). DMA engine 116 consists of a processor interface 122, DMA logic 124, a memory interface 126, and a DMA network interface 128, injection counters 130, Injection FIFO Metadata 132, reception counters 134, reception FIFO Metadata 136 and status and control registers 138. The Injection FIFO Metadata 132 describes where in memory (114) the Injection FIFOs 118 are located and the current head and tail of the FIFOs. The Reception FIFO Metadata 136 describes where in memory the Reception FIFOs 120 are located, and the current head and tail of the FIFOs. Especially in a system-on-a-chip implementation, the amount of logic area devoted to the DMA engine is extremely limited, and thus the number of counters is relatively small. It follows that effective sharing of counters between multiple messages is needed to ensure good performance.

DMA engine 116 directly controls transfer of long messages, which long messages are typically preceded by short protocol messages deposited into reception FIFOs on a receiving node (for example, a reception FIFO 120 in memory 114 of compute node 102(2)). Through these protocol messages, the sender, source or origincompute nodes, and the receiver, target or destination compute nodes agree on which injection counter (130) and reception counter (134) identifications to use for message passing, and what the base offsets are for the messages being processed. Long message transfer may be initiated by a core processor on the sender node by placing a "put" message descriptor into an Injection FIFO 118 (in memory 114), writing the injection counter base and value via writes via the DMA engine's memory interface 126, and appropriately modifying the Injection FIFO Metadata 132 for Injection FIFO containing that message. This includes advancing a tail pointer indicating the "last" message descriptor in the via a "write" to the DMA processor interface 122. DMA logic 124 reads the Injection FIFO Metadata 132, and recognizes which Injection FIFOs have messages to be sent.

The DMA logic causes the DMA memory interface 126 to read the descriptor in an Injection FIFO 118 (in memory 114). The put message descriptor includes the injection (130) and reception counter (134) identifications to be used, the message length, the initial injection and reception offsets of the message, the destination node and other network routing information. The DMA engine 116 begins fetching the message and assembling it into packets to be "put" on to the network (108). Each packet contains an offset from the reception counter (134) where the data from this packet is to be stored, and a count of how many bytes in this packet should be written. DMA engine 116 is responsible for updating this information correctly for each packet, and puts the packets into the DMA network interface 128 (when space is available), at which time the packet enters the network and is routed to the destination compute node (e.g., compute node (p)).

After DMA engine 116 puts the message in the DMA network interface 128, it decrements the specified injection counter 130 by the number of bytes in the packet. Upon reaching the destination, the packet is put into the DMA network interface at that compute node (e.g., 102(p), and the target node's DMA engine "recognizes" that the packet is there. The DMA engine at the receiver or target compute node reads the reception counter identification, offset and count from the received packet, looks up the reception counter base address, writes the appropriate number of bytes starting at the base plus packet offset, and then decrements the counter value by the bytes.

If a remote get operation is used, instead of the processor on the sender node injecting a descriptor into the Injection FIFO 118, the receiver node sends a short get message (which contains a put descriptor) to the sender compute node (e.g., 102(p)), and the DMA logic at the sender compute node puts this descriptor into the Injection FIFO and advances that FIFO's data appropriately. To share a byte counter, the base address of the shared counter must be set to a value smaller than the base address of any message to be using that counter. The initial value of the counter is set to zero. The initial offset in a message descriptor is the message's starting address minus this base offset. The particular processor increments the counter value by the current message length, and in accordance with the novel operation, said processor need only know the current message length, but not the lengths of the other messages using this counter, nor the number of bytes that have already been received. The reader should note that the byte counter can be shared between messages even if the messages come from different source (sender) nodes.

Network 108 preferably displays a 10 Gb Ethernet functionality, providing all the network link cut-through routing buffers and routing control block that allows any two nodes to communicate with low latency. The four (or "p") processor cores embedded in ASIC (node 102(1)) as shown may be utilized for message handling and computation operations. Virtual cut-through torus routing is supported in a hardware block, which is integrated into the compute nodes (102(p)) to allow for the elimination of the network adapter, typically required in conventional parallel computer system operation. Preferably, a virtual channel routing network is supported with two (2) dynamic and two (2) deterministic channels.

The same compute node ASIC construction is used as an I/O node, which is associated with a subset of the compute nodes (e.g., 16, 32, 64, or 128 compute nodes), for handling fileserver communication and I/O operations. The only difference between an I/O compute node and a computation compute node is that an I/O node enables and uses an external network interface, such as the 10 Gigabit Ethernet. While the compute nodes may have the integrated 10 Gb Ethernet (they share a common ASIC), for purposes of discussion, the 10 Gb Ethernet interface is enabled at the I/O nodes only. The 10 Gb Ethernet functional units (XEMAC, ToMAL) interfaces to an arbiter, which arbitrates inputs to L3 from torus DMA and from the 10 Gb Ethernet. This allows the processor within a compute node to set up a transfer and return to handling messages with very little overhead.

As indicated herein, it should be understood that the present invention could be realized in hardware, software, or a combination of hardware and software, such as in the ultrascalable petaflop parallel supercomputer described above. The invention, however, is not limited to applications therein, but may be implemented in any kind of parallel computer/server system(s)—or other parallel computer system adapted for carrying out the novel message passing DMA engine for repeat communications described herein. A typical combination of hardware and software could be any general-purpose multiple parallel computer system or network with a computer program that, when loaded and executed, carries out the respective methods described herein. Alternatively, a specific use parallel computer system, or linked computer network, containing specialized hardware for carrying out one or more of the functional tasks of the invention, could be utilized.

For that matter, the present invention can also be embodied in a computer program product, which comprises all the respective features enabling the implementation of the methods for utilizing the DMA engine described herein, for example, the exemplary methods depicted in figures herein, and which product—when loaded in the parallel computer system or network, is able to carry out these and related methods. Computer program, software program, program, or software, in the present context mean any expression, in any language, code or notation, of a set of instructions intended to cause a parallel computer network or system having an information processing capability to perform a particular function either directly or after either or both of the following: (a) conversion to another language, code or notation; and/or (b) reproduction in a different material form.

Figure 3:
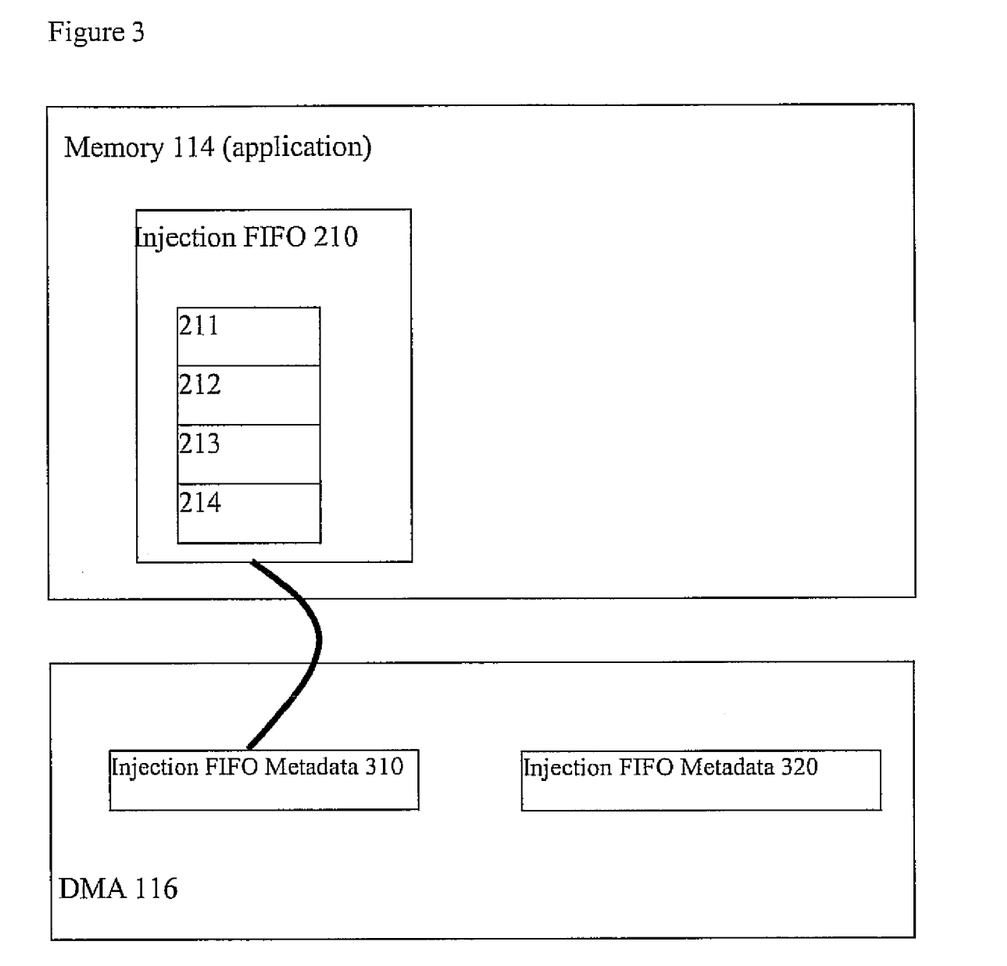
FIG. 3 is a schematic diagram illustrating one embodiment of the novel DMA engine for repeating communication patterns, included in the FIG. 1 parallel computer system.

In FIG. 3, the ejection FIFO Metadata 132 of the DMA engine 116 of node 102(1) of a parallel computer system 100 (FIG. 1) is illustrated as two pieces of Injection FIFO Metadata 310, 320, where each piece can describe an Injection FIFO set aside for the local instance of the message-passing application operating at the compute node comprising same. The Injection FIFO Metadata, 310, 320, accommodates the novel DMA engine operation, and therefore, the global message-passing network operation. Injection FIFO Metadata 310 describes the Injection FIFO 210 of memory 114, but Injection FIFO Metadata 320 as shown in FIG. 3 has not been configured in view of the fact that there is no Injection FIFO associated with it seen in memory 114 (the way that the presence of Injection FIFO 210 can be attributed to Injection FIFO Metadata 310). That is, Injection FIFO Metadata 320 has not been configured by the message-passing application with an Injection FIFO, such as Injection FIFO 210 associated with Injection FIFO Metadata 310, as mentioned.

Figure 3A:
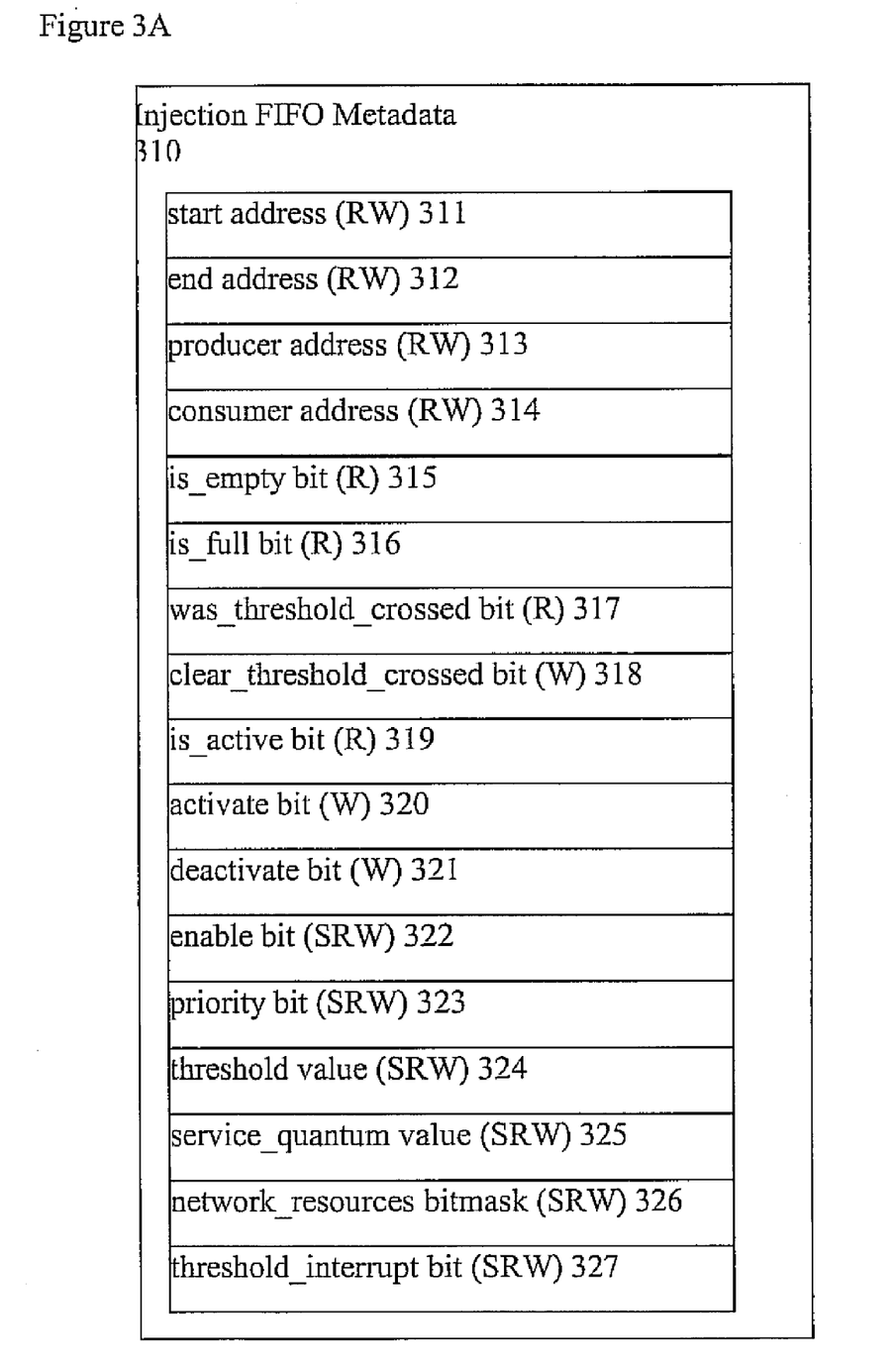
FIG. 3A is a schematic diagram illustrating for a single Injection FIFO the Injection FIFO Metadata of the DMA engine for repeating communication patterns of the invention.

FIG. 3A herein is a schematic diagram illustrating a preferred embodiment of Injection FIFO Metadata 310 of the invention (introduced with reference to FIG. 3), for a single Injection FIFO 210 and its implementation as a circular queue buffer. Injection FIFO Metadata 310 contains various fields 311-327 for controlling the Injection FIFO 210 and supporting the novel message-passing operation within a parallel computer system (not shown in FIG. 3). Any of fields 311-327 marked (R) are readable only, and any marked (W) are writable. Any of fields marked (S) are only accessible via protected system calls, and not directly via the message-passing or communication application. For each bit field, for example, message field 315 as shown in FIG. 3, a corresponding bit from the metadata of 32 Injection FIFOs is collected into a single 32-bit word of metadata for more efficient control of multiple Injection FIFOs. The fields 311-327 are further described below.

The injection FIFOs (210) are circular buffers within the application memory (114), and define a start address 311, and an end address 312 of a buffer. The Injection FIFOs may be thought of as a producer-consumer queue with the communication software application acting as the producer, and the DMA network interface acting as the consumer. The producer queue Injection FIFO further includes a producer address 313 (producer queue address), and the consumer address 314 (consumer queue address). In operation similar to that known in the prior art, a communication software application injects a message by incrementing the producer address 313. When space in the network is available, the DMA engine 116 fetches the message descriptor at the consumer address 314, and injects the corresponding message into the network (via DMA network interface 128). The DMA engine 116 then increments the consumer address 314.

For that matter, the DMA engine 116 preferably provides 128 Injection FIFOs descriptors, and, therefore, up to 128 active Injection FIFOs. With respect to multicore node operation, this novel feature allows for each core to have its own Injection FIFO, and in some cases, multiple Injection FIFOs. Such novel operation improves performance of a large message by splitting the large message across multiple Injection FIFOs. A network_resources bitmask 326, shown in FIG. 3A within Injection FIFO Metadata 310 specifies the network resources available to messages in the Injection FIFO. Network resources such as network_resources bitmask 326 include operation in view of network priorities. The resources include network buffers and network links, where splitting network resources across multiple Injection FIFOs allows a communication (message-passing) software application to better control use of network resources.

Injection FIFO Metadata 310 further comprises an is_empty bit (315), which allows a communication application to efficiently determine if all the message descriptors in the FIFO have been sent. Put another way, in order to determine if there is work to be done by the DMA engine, the is_empty bit 315 represents whether there are additional, or any message descriptors to be sent. The Injection FIFO Metadata 310 further comprises an is_fill bit (316), which is used to allow the a communication application to efficiently determine if there is room in the descriptor for injecting additional message descriptors. That is, the is_full bit (316) is used by the local instance of the message passing application to determine whether there are more message descriptors (load) to be operated upon (the producer of the Injection FIFO). A was_threshhold_crossed_bit (317) records if the free space in the Injection FIFO was ever below the threshhold value (324). Was_threshhold_crossed_bit (317) can be cleared using the clear_threshold_crossed bit (318), and a threshold_interrupt bit (327) supports determining whether crossing the threshhold also causes an interrupt for the processor cores (comprising a compute node).

In the Injection FIFO Metadata 310, an enable bit (322) is included for determining whether the Injection FIFO Metadata is available for application use. If the enable bit (322) is not set, the descriptor is ignored by the DMA engine. If priority bit (323) is set, the descriptor is served by the DMA engine more frequently than descriptors without this bit set. Service_quantum value (325) is included for determining how many message payload bytes should be sent from this Injection FIFO Metadata by the DMA engine, assuming room in the network is available, before serving another Injection FIFO Metadata. The is_active bit (319) is used by the application to determine if the descriptor is active.

In some applications, there are multiple communication patterns that may be active during different parts of the application. Each such pattern may be described by a the message descriptors within an Injection FIFO. If the number of such patterns is greater than the number of Injection FIFOs supported by the Injection FIFO Metadata, we describe how the DMA can be reprogrammed so that Injection FIFO Metadata can be switched with very low overhead from one communication pattern to another. The DMA engine 116 only serves the Injection FIFO Metadata if it is active; the Injection FIFO Metadata is activated by the communication application using the activate bit (320). The communication application de-activates the descriptor using the de-activate bit (321). In this case, the application uses the is_empty bit (315) to see if Injection FIFO Metadata is finished its current Injection FIFO and is available for a new Injection FIFO. If is_empty bit is set, the application may de-activate the Injection FIFO using deactivate bit 321. This deactivation ensures that the DMA engine does not act on inconsist information in the Injection FIFO Metadata while is being reprogrammed by the application from one Injection FIFO to another. To reprogram the Injection FIFO Metadata, the application then writes in the new Injection FIFO Metadata consisting of the start, end, producer and consumer addresses. The application then re-activates the Injection FIFO Metadata using the bit 320. In this way, only the Injection FIFO Metadata is reprogrammed to point to a different Injection FIFO in memory 114; the message descriptors in these different Injection FIFOs need not be reprogrammed.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention.

What is claimed is:

1. A parallel computer system comprising a network of interconnected compute nodes that operates a global message-passing application for performing communications across the network, wherein each of the compute nodes comprises one or more individual processors with memories, wherein local instances of the global message-passing application operate at each compute node to carry out local processing operations independent of processing operations carried out at other compute nodes, and wherein each compute node further comprises:

a DMA engine constructed to interact with the application via Injection FIFO Metadata, wherein the Injection FIFO Metadata comprises an address that points to an Injection FIFO buffer having one or more message descriptors, and the DMA engine is operable to retrieve a message descriptor from the Injection FIFO buffer, the DMA engine injecting a message that corresponds to the message descriptor into the network, the DMA engine having a fixed processing overhead for said injecting irrespective of the number of message descriptors stored in the Injection FIFO buffer, wherein if there is a greater number of communication patterns than available Injection FIFO Metadata, the local instance of the global message-passing application determines whether an Injection FIFO buffer described by the Injection FIFO Metadata at the DMA network interface has completed the messages of the current communication pattern and is available for a new communication pattern and deactivates that Injection FIFO Metadata to control that the DMA engine does not access the current content of the Injection FIFO buffer while it is rewritten for the Injection FIFO buffer of the new communication pattern.

2. The parallel computer system as set forth in claim 1, wherein the DMA engine is constructed to accept Injection FIFO Metadata for multiple Injection FIFO buffers.

3. The parallel computer system as set forth in claim 1, wherein the Injection FIFO buffers comprise circular buffers.

4. The parallel computer system as set forth in claim 3, wherein the DMA engine includes both a producer pointer and a consumer pointer, which producer and consumer pointers point to all message descriptors to be provided to the circular buffers beginning at a first circular buffer position.

5. The parallel computer system as set forth in claim 4, wherein the DMA engine advances the consumer pointer as messages are sent.

6. The parallel computer system as set forth in claim 5, wherein during message-passing operation by which the local instance of the global message-passing application sends the same communication message pattern repetitively, or iteratively, the local instance of the application sets the consumer pointer to the first buffer position at the compute node where the local instance is running.

7. The parallel computer system as set forth in claim 1, wherein the Injection FIFO Metadata provides the local instance of the global message-passing application with fine-grain control over the Injection FIFO buffers.

8. The parallel computer system as set forth in claim 1, wherein the local instance of the application then writes a description of a new Injection FIFO buffer and re-activates the Injection FIFO Metadata.

9. The parallel computer system as set forth in claim 8, wherein the writing of the reactivated Injection FIFO Metadata includes writing a start address, an end address, a producer address and a consumer address for the new Injection FIFO buffer.

10. The parallel computer system as set forth in claim 1, wherein the determining of whether the Injection FIFO buffer is completed and whether its Injection FIFO Metadata should be deactivated is controlled by use of a single "is_empty bit" is set.

11. A parallel computer system comprising a compute node comprising:
a DMA engine, a network of interconnected compute nodes, said DMA engine supporting a global message-passing operation and controlled from an application via Injection FIFO Metadata,
wherein the Injection FIFO Metadata comprises an address pointing to an Injection FIFO buffer located in said DMA engine, said injection FIFO buffer having one or more message descriptors, the DMA engine operable to process messages with a fixed processing overhead irrespective of the number of message descriptors stored in the Injection FIFO buffer,
wherein if there is a greater number of communication patterns than available Injection FIFO Metadata, a local instance of the global message-passing application determines whether an Injection FIFO buffer described by the Injection FIFO Metadata at a DMA network interface has completed the messages, of a current communication pattern and is available for a new communication pattern and deactivates that Injection FIFO Metadata to control that the DMA engine does not access the current content of the injection FIFO buffer while it is rewritten for the Injection FIFO buffer of the new communication pattern.

12. A method for passing messages within a parallel computer system comprising a network of interconnected compute nodes, wherein each of the compute nodes comprises one or more individual processors, memory and DMA engine, the method comprising the steps of:
running a global message-passing application across the parallel computer system including running local instances at each compute node for passing messages into and out of the compute node by operation independent of other compute nodes; and
exchanging messages with the compute nodes, with a DMA engine via Injection FIFO Metadata, wherein the Injection FIFO Metadata comprises an address pointing to an Injection FIFO buffer located in said DMA engine, said injection FIFO buffer having one or more message descriptors, and the DMA engine is operable to retrieve a message descriptor stored at the memory address, the DMA engine injecting a message that corresponds to the message descriptor into the network with a fixed processing overhead for injecting irrespective of the number of message descriptors stored in the Injection FIFO buffer, wherein if there is a greater number of communication patterns than available Injection FIFO Metadata, the local instance of the global message-passing application further performs the steps of:
determining whether an Injection FIFO buffer described by the Injection FIFO Metadata at the DMA network interface has completed the messages of a current communication pattern and is available for a new communication pattern; and
deactivating the Injection FIFO Metadata to control that the DMA engine does not access the current content of the Injection FIFO buffer while it is rewritten for the Injection FIFO buffer of the new communication pattern.

13. The method of claim 12, wherein the local instance of the application further performs the steps of:
writing a description of a new Injection FIFO buffer; and reactivating the Injection FIFO Metadata.

14. The method of claim 13, wherein the local instance of the application further performs the steps of:
writing a start address, end address, producer address and consumer address to the reactivated Injection FIFO Metadata for the new Injection FIFO buffer.

15. A computer program product comprising:
a non-transitory storage medium readable by a processing circuit and storing instructions for execution by the processing circuit for performing a method comprising:
passing messages within a parallel computer system comprising a network of interconnected compute nodes, wherein each of the compute nodes comprises one or more individual processors, memory and DMA engine, the method comprising the steps of:
framing global message-passing application across the parallel computer system including running local instances at each compute node for passing messages into and out of the compute node by operation independent of other compute nodes;
exchanging messages with the compute nodes, in which each compute node also includes a DMA engine constructed to interact with the application via Injection FIFO Metadata, wherein the Injection FIFO Metadata comprises an address pointing to an Injection FIFO buffer located in said DMA engine, said Injection FIFO buffer having one or more message descriptors, and the DMA engine is operable to retrieve the message descriptor stored at the memory address, the DMA engine further injecting a message that corresponds to the message descriptor into the network with a fixed processing overhead for injecting irrespective of the number of message descriptors stored in the Injection FIFO buffer;
determining whether the Injection FIFO buffer described by the Injection FIFO Metadata at the DMA network interface has completed the messages of a current communication pattern and is available for a new communication pattern; and
deactivating the Injection FIFO Metadata to control that the DMA engine does not access the current content of the Injection FIFO buffer while it is rewritten for the Injection FIFO buffer of the new communication pattern.

16. The computer program product of claim 15, further comprising:
writing a description of a new Injection FIFO buffer; and reactivating the Injection FIFO Metadata.

17. The computer program product of claim 16, further comprising writing a start address, an end address, a producer address and a consumer address to the reactivated Injection FIFO Metadata for the new Injection FIFO buffer.

18. A computer system comprising a sending node comprising a first DMA engine for facilitating injection of one or more message descriptors and a first memory coupled by a network interface to a receiving node comprising a second DMA engine and a second memory, wherein the sending node communicates with the receiving node via Injection FIFO Metadata, wherein the Injection FIFO Metadata comprises an address pointing to an Injection FIFO buffer located in the first DMA engine, said injection FIFO buffer having one or more message descriptors, the first DMA engine having a fixed processing overhead for injecting irrespective of the number of message descriptors stored in the Injection FIFO buffer, wherein the sending node further comprises a processor, and communication between the sending node and the receiving node is initiated by the processor modifying the Injection FIFO buffer with a put message descriptor and updating the Injection FIFO Metadata to correspond to the modified Injection FIFO buffer, the first DMA engine reads the Injection FIFO Metadata, retrieves the corresponding Injection FIFO buffer, retrieves a message described by the put message descriptor within the Injection FIFO buffer, and injects the message described by the put message descriptor into the network interface and the second DMA engine receives the message from the network interface, and writes the message to the second memory using information stored within the put message descriptor and the put message descriptor comprises an injection counter, a reception counter, a message length, an injection offset, a reception offset and a receiving node identifier.

\* \* \* \* \*